UNITED STATES PATENT OFFICE.

CHARLES McBURNEY, OF ROXBURY, MASSACHUSETTS.

IMPROVEMENT IN UTILIZING WASTE VULCANIZED RUBBER.

Specification forming part of Letters Patent No. 33,094, dated August 20, 1861.

*To all whom it may concern:*

Be it known that I, CHAS. McBURNEY, of Roxbury, in the county of Norfolk and State of Massachusetts, have invented a new and Improved Process of Utilizing Waste Vulcanized India-Rubber; and I hereby declare the following to be a full, clear, and exact description of the same and of the characteristics which distinguish it from anything heretofore known.

The processes heretofore employed for the purpose of reusing waste vulcanized rubber have either been expensive on account of the nature of the solvents employed, or they have involved expensive machinery and have been attended with danger to the operatives, as in the case where superheated steam was employed.

My present invention has for its object not only to avoid the use of machinery, but also of all solvents, and to restore to the rubber those properties of which it was divested by the process of vulcanization to which it has already been subjected, and this I accomplish by adding to the waste rubber after it has been suitably comminuted a portion of oil, which, having no solvent action whatever upon the gum, simply restores to it those properties and that capability of being again vulcanized which it possessed in the crude state.

To enable others skilled in the art to understand my invention, I will proceed to describe more in detail the manner in which I have carried it out.

Waste scraps or worn-out articles of vulcanized rubber—such as old shoes, car-springs, &c.—are reduced by any suitable process to fine powder or dust. This is best accomplished by the ordinary friction-rolls used for grinding crude rubber and mixing rubber compounds. To one hundred pounds of the rubber thus ground are added forty to fifty pounds of oil—such as pine or rosin oil, cotton-seed oil, olive-oil, castor-oil, palm-oil, or cocoanut-oil. This mixture is allowed to stand from twenty-four to seventy-five hours. Then to every one hundred pounds of the mixture is added fifty pounds of crude gum, together with the other ingredients usually employed in the manufacture of vulcanized-rubber goods. The mixture is then taken to the grinding-rolls and the whole is thoroughly ground and incorporated together. The proportions of the various ingredients may be greatly varied, according to the use to which the compound is to be applied. As an example, to twenty-five pounds of ground waste vulcanized rubber may be added ten to twelve pounds of the oil, fifteen to eighteen pounds new rubber, five to seven pounds white lead or oxide of zinc, five to seven pounds whiting, pipe-clay, or any fine silica, and from one to three pounds flowers of sulphur, the whole being thoroughly mixed and ground, as before.

The proportions given above for the waste rubber and oil are not rigid, but may be varied to a moderate extent without materially altering the result. Forty pounds of oil to one hundred pounds waste rubber I have found to answer for most purposes. I have not, however, found it well greatly to alter the proportions given above for the waste and crude rubber by the increase of the quantity of the former, though it is obvious that these proportions may be altered to any extent by the increase of the quantity of the crude rubber.

I am aware that olive-oil has been employed in the original manufacture of india-rubber compounds; but this has been done with an entirely different object and result. I therefore lay no claim to such employment of fixed vegetable oils. Neither do I lay claim to any essential oils or any other solvents for the purpose of restoring waste vulcanized rubber, as I make no use of such oils or solvents.

What I claim as my invention, and desire to secure by Letters Patent, is—

The use of the oils mentioned, in combination with waste vulcanized india-rubber and crude gum or rubber, as set forth, for the purpose specified.

CHAS. McBURNEY.

Witnesses:
THOS. R. ROACH,
P. E. TESCHEMACHER.